United States Patent
Choi et al.

(10) Patent No.: US 8,842,600 B2
(45) Date of Patent: Sep. 23, 2014

(54) METHOD AND APPARATUS OF RELAYING OPERATION USING UPLINK RESOURCE

(75) Inventors: Youngseob Choi, Gyeonggi-Do (KR); Hanbyul Seo, Gyeonggi-Do (KR); Byounghoon Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 13/388,293

(22) PCT Filed: Aug. 13, 2010

(86) PCT No.: PCT/KR2010/005353
§ 371 (c)(1),
(2), (4) Date: Jan. 31, 2012

(87) PCT Pub. No.: WO2011/019243
PCT Pub. Date: Feb. 17, 2011

(65) Prior Publication Data
US 2012/0127918 A1    May 24, 2012

Related U.S. Application Data

(60) Provisional application No. 61/233,840, filed on Aug. 14, 2009.

(30) Foreign Application Priority Data

Jan. 13, 2010  (KR) ................. 10-2010-0003254

(51) Int. Cl.
*H04B 7/14* (2006.01)
*H04W 88/04* (2009.01)
*H04L 5/00* (2006.01)

(52) U.S. Cl.
CPC ............. *H04W 88/04* (2013.01); *H04L 5/0007* (2013.01); *H04L 5/0053* (2013.01); *H04L 5/0035* (2013.01)
USPC .......................................................... 370/315

(58) Field of Classification Search
USPC .......................................... 370/315, 338, 314
See application file for complete search history.

(56) References Cited

U.S. PATENT DOCUMENTS

| | | | | |
|---|---|---|---|---|
| 7,117,002 B2 * | 10/2006 | Kanazawa et al. | ............ | 455/519 |
| 7,606,182 B2 * | 10/2009 | Park et al. | ............ | 370/279 |
| 8,089,917 B2 * | 1/2012 | Feng et al. | ............ | 370/315 |
| 8,094,595 B2 * | 1/2012 | Montojo et al. | ............ | 370/311 |
| 8,553,711 B2 * | 10/2013 | Borran et al. | ............ | 370/431 |
| 2009/0003261 A1 * | 1/2009 | Kim | ............ | 370/315 |

FOREIGN PATENT DOCUMENTS

| | | |
|---|---|---|
| KR | 1020090037186 | 4/2009 |
| WO | 2004079995 | 9/2004 |
| WO | 2009048204 | 4/2009 |

* cited by examiner

*Primary Examiner* — Mohammad Anwar
(74) *Attorney, Agent, or Firm* — Lee, Hong, Degerman, Kang & Waimey

(57) ABSTRACT

Disclosed is a method for relaying operation of a terminal using uplink resources. A method for receiving data using uplink resource in a method for receiving a communication service of a base station through a relay signal of an adjacent terminal present in a service area of the base station, includes: changing into an uplink resource reception mode to receive data from uplink resource; when the adjacent terminal delivers transmission data of the base station, receiving the data through the uplink resource; and decoding the received data.

11 Claims, 6 Drawing Sheets

(a) time t (b) time t+△

······▶ uplink channel
———▶ downlink channel (a) time t (b) time t+△

······▶ uplink channel
———▶ downlink channel

METHOD AND APPARATUS OF RELAYING OPERATION USING UPLINK RESOURCE

CROSS-REFERENCE TO RELATED APPLICATIONS

This application is the National Stage filing under 35 U.S.C. 371 of International Application No. PCT/KR2010/005353, filed on Aug. 13, 2010, which claims the benefit of earlier filing date and right of priority to Korean Application No. 10-2010-0003254, filed on Jan. 13, 2010, and also claims the benefit of U.S. Provisional Application Ser. No. 61/233,840, filed on Aug. 14, 2009, the contents of which are all incorporated by reference herein in their entirety.

TECHNICAL FIELD

The present invention relates to a method for relaying operation of a terminal and, more particularly, to a method for relaying operation of a terminal using uplink resources.

BACKGROUND ART

Recently, in communication systems, higher service frequency bands are increasingly used and cells tend to become gradually smaller in order to accommodate or handle high speed communication and more traffic, so the use of the existing centralized cellular radio network scheme as it involves many problems. Namely, because locations of base stations are fixed, flexibility in configuring radio links is degraded, making it difficult to provide an effective communication service in a radio environment in which a traffic distribution or a traffic demand changes severely.

In an effort to solve the problem, a relay system has been proposed. The relay system is advantageous in that a partial shadow area generated in a cell coverage is covered to extend a cell service coverage, a system capacity can be increased, and the use of a relay node in an initial situation in which a service request is scarce reduces the burden of initial installation costs.

The relay node in the relay system serves as a fixed or mobile small base station to substantially extend a system capacity and a service area of a base station. In particular, in case of the mobile relay node, a terminal may serve as a relay node to relay a communication service between an adjacent terminal located outside the service area of the base station or located in a shadow area and the base station.

However, when the terminal serves as a relay node, resource for exchanging data with the adjacent terminal is additionally required and a signal interference problem arises with other base station or a nearby terminal.

DISCLOSURE OF INVENTION

Solution to Problem

Therefore, in order to address the above matters, the various features described herein have been conceived.

An aspect of the present invention provides a terminal relay operation method and apparatus using uplink resource.

Another aspect of the present invention provides an operation method and apparatus of a relay terminal to provide an emergency service in the occurrence of a disaster or an emergency call.

Another aspect of the present invention provides a method and apparatus capable of obtaining cooperative diversity by receiving multicast or broadcast service data from a base station or a relay terminal.

According to an aspect of the present invention, there is provided a method for receiving data using uplink resource in order to receive a communication service of a base station through a relay signal of an adjacent terminal present in a service area of the base station, including: changing into an uplink resource reception mode to receive data from uplink resource; when the adjacent terminal delivers transmission data of the base station, receiving the data through the uplink resource; and decoding the received data.

In changing into the uplink resource reception mode, when a reception signal from downlink resource is not detected for more than a certain time, a current mode may be changed to the reception mode, and changing into the reception mode through a downlink control signal previously received from the base station may be previously set, or the current mode may be changed into the reception mode according to a user setting.

The uplink resource may be a subframe of an uplink frequency band or a subframe of an uplink time interval.

The base station may not allocate the uplink resource to a nearby terminal so that no interference can occur with uplink resource of the nearby terminal while the adjacent terminal is delivering transmission data of the base station through the uplink resource.

The data may be service data or an emergency call.

According to another aspect of the present invention, there is provided a relay operation method of a relay terminal relaying a communication service between an adjacent terminal and a base station by using uplink resource, including: receiving a control signal set to receive data through uplink resource from the base station; changing into an uplink resource reception mode so that data can be received through the uplink resource based on the received control signal; receiving data through the uplink resource from the adjacent terminal; changing into a normal mode so that data can be transmitted to the base station through the uplink resource; and transmitting the data received from the adjacent terminal to the base station through the uplink resource.

The control signal may be periodically received.

The uplink resource may be a subframe of an uplink frequency band or a subframe of an uplink time interval.

In changing into the uplink resource reception mode, a current mode may be changed into the uplink resource reception mode according to a certain time or period set in a control signal.

The data may be an emergency call.

Data reception from the adjacent terminal through the uplink resource and data transmission to the base station through the uplink resource are performed at different periods.

According to another aspect of the present invention, there is provided a relay terminal relaying a communication service between an adjacent terminal and a base station, including: a reception unit configured to receive data from the base station and the adjacent terminal; a controller configured to receive a control signal, set to receive data through an uplink resource, from the base station through receiving unit and configured to provide control to change into an uplink resource reception mode in order to receive data through the uplink resource from the adjacent terminal and configured to provide control to change into a normal mode in order to transmit the data received form the adjacent terminal to the base station through the uplink resource; and a transmission unit configured to transmit the data received from the adjacent terminal through the uplink resource to the base station.

The controller may provide control to change into the uplink resource reception mode according to a certain time or period set in the control signal, and the data may be an emergency call.

According to exemplary embodiments of the present invention, because a relay service can be performed between terminals by using uplink resources, additional resource is not required and an emergency service such as an emergency call in the occurrence of disaster can be provided through an adjacent terminal.

In addition, multicast or broadcast data provided by a base station can be received from the base station and a relay terminal, thus obtaining cooperative diversity.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
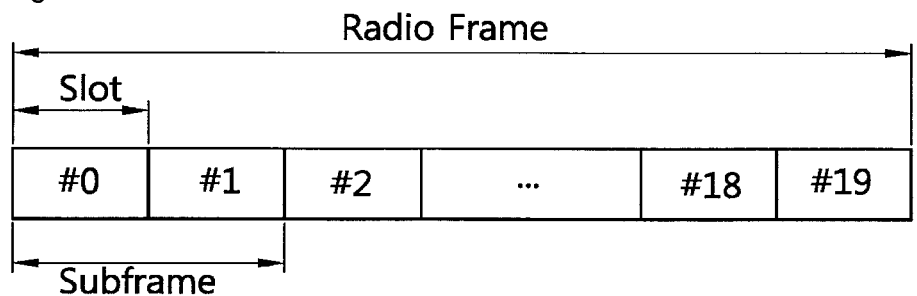
FIG. 1 is a view showing the structure of a downlink radio frame according to an exemplary embodiment of the present invention.

Reference will now be made in detail to the preferred embodiments of the present invention, examples of which are illustrated in the accompanying drawings.

The present invention is applied to a mobile communication system and, more particularly, to an evolved universal mobile telecommunications system (E-UMTS) evolving from a UMTS. However, the present invention is not meant to be limited thereto and can be applicable to any communication system and communication protocol to which the technical idea of the present invention is applied.

The present invention may be modified variably and may have various embodiments, particular ones of which will be illustrated in drawings and described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Hereinafter, technical terms used in the present disclosure are defined as follows.

A communication system according to an exemplary embodiment of the present invention is a system for providing various communication services such as voice and packet data, and the like, including a base station and a terminal. A long term evolution (LTE) system or an LTE-advanced system will be described as a typical example of the communication system.

The terminal according to an exemplary embodiment of the present invention may also be referred to as subscriber station (SS), user equipment (UE), mobile equipment (ME), mobile station (MS), and the like, and may include a portable device having a communication function such as a mobile phone, a PDA, a smart phone, a notebook, and the like or a non-portable device such as a PC or a vehicle-mounted device.

The base station (BS) refers to a fixed position communicating with the terminal and may also be referred to as eNB (evolved-NodeB), base transceiver system (BTS), access point (AP), and the like. One or more cells may exist in one base station, and an interface for transmitting user traffic or control traffic may be used between base stations. Downlink refers to a communication channel from the BS to the terminal, and uplink refers to a communication channel from the terminal to the BS.

A multi-access scheme applied to the wireless communication system according to an exemplary embodiment of the present invention includes any multi-access scheme such as a code division multiple access (CDMA), a time division multiple access (TDMA), a frequency division multiple access (FDMA), a single carrier-frequency division multiple access (SC-FDMA), an orthogonal frequency division multiple access (OFDMA), and the like.

Multi-access methods for downlink and uplink transmission may differ, and for example, downlink may employ an OFDMA scheme while uplink may employ an SC-FDMA scheme.

Embodiments of the present invention will be described below in detail with reference to the accompanying drawings, where those components are rendered the same reference number that are the same or are in correspondence, regardless of the figure number, and redundant explanations are omitted.

FIG. 1 is a view showing the structure of a downlink radio frame according to an exemplary embodiment of the present invention.

A downlink radio frame according to an exemplary embodiment of the present invention includes ten subframes, and one subframe includes two slots. The downlink radio frame may be configured by frequency division duplex (FDD) or time division duplex (TDD). A duration in which one subframe is transmitted is called a transmission time interval (TTI). For example, the length of a single subframe may be 1 ms, and the length of a single slot may be 0.5 ms. A single slot may include a plurality of OFDM symbols in a time domain and a plurality of resource blocks in a frequency domain.

Figure 2:
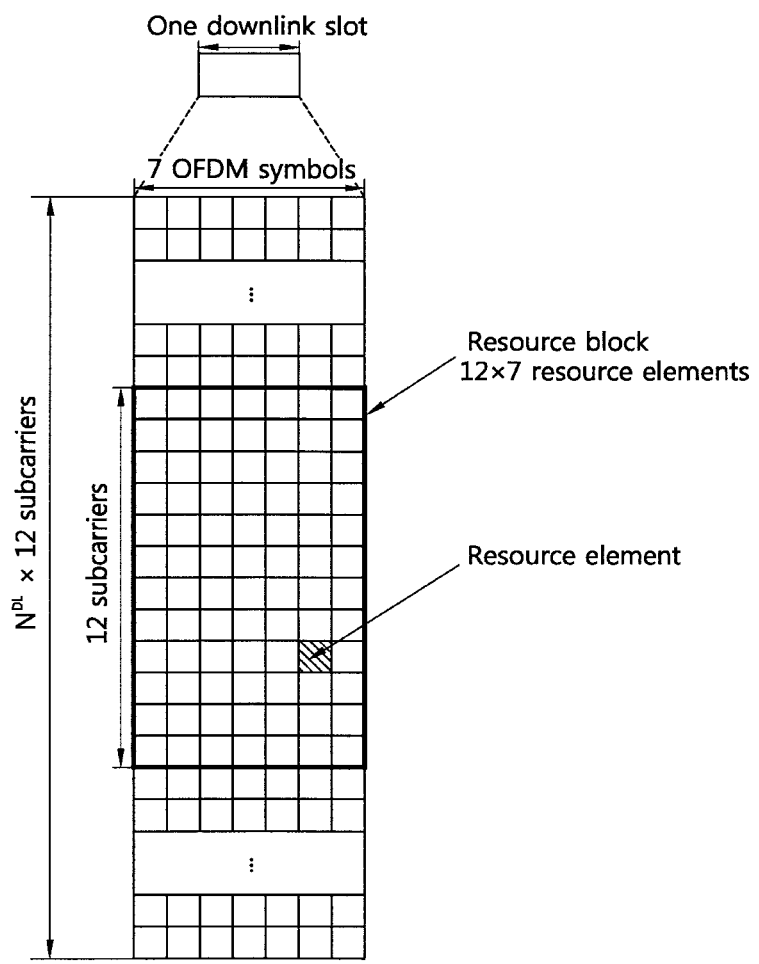
FIG. 2 is a view illustrating a resource grid with respect to a single downlink slot according to an exemplary embodiment of the present invention.

FIG. 2 is a view illustrating a resource grid with respect to a single downlink slot according to an exemplary embodiment of the present invention.

As shown in FIG. 2, a downlink slot includes a plurality of FODM symbols in the time domain and a plurality resource blocks (RBs) in the frequency domain. The number of OFDM symbols included in a single slot may differ depending on the configuration of a cyclic prefix (CP), and the illustrated example is a general CP. In this case, the number of OFDM symbols included in a single slot is seven, and when it is configured by an extended CP, the length of one OFDM symbol extends. Thus, the number of OFDM symbols included in the single slot may be six, which is smaller than that of the general CP. The extended CP is applied when a channel state is unstable such as in the case where the terminal moves at a fast speed, and the extended CP may be used in order to further reduce inter-symbol interference.

With reference to FIG. 2, one downlink slot includes seven OFDM symbols, and one resource block (RB) includes 12 subcarriers. Also, each element on the resource grid is called a resource element, and one resource block includes 84 resource elements (12×7=84). The interval of each subcarrier is 15 kHz, and one resource block includes about 180 KHz in the frequency domain. NDL is the number of resource blocks included in the downlink slot, and is dependent upon a downlink transmission bandwidth set by scheduling of the base station.

In case of the general CP as shown in FIG. 2, one subframe includes 14 OFDM symbols, and the first two or three OFDM symbols of each subframe may be allocated to a physical downlink control channel (PDCCH) and the other remaining OFDM symbols may be allocated to a physical downlink shared channel (PDSCH).

Figure 3:
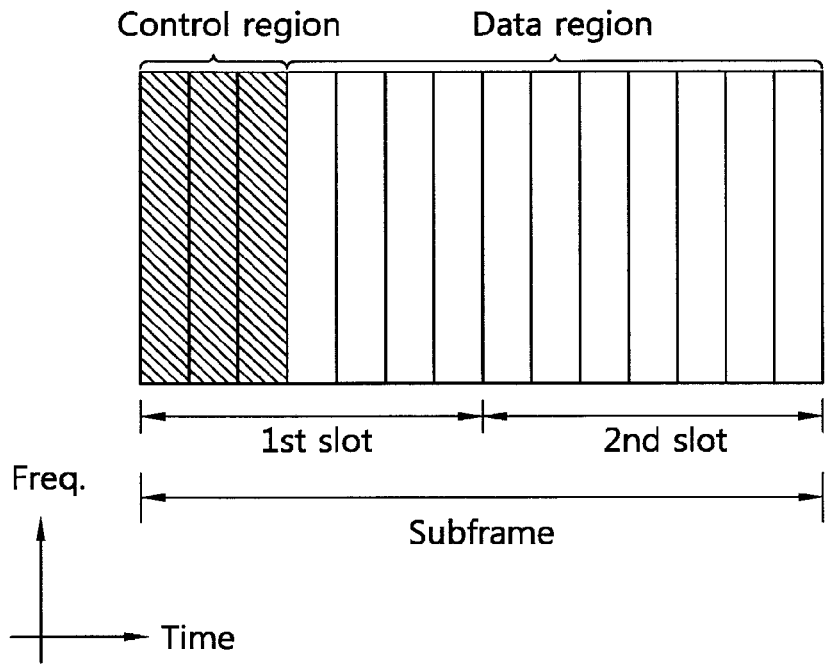
FIG. 3 is a view illustrating the structure of a downlink subframe according to an exemplary embodiment of the present invention.

FIG. 3 is a view illustrating the structure of a downlink subframe according to an exemplary embodiment of the present invention.

As shown in FIG. 3, a maximum three OFDM symbols positioned at a front portion of a first slot of one subframe are allocated as a control region to a control channel. The other remaining OFDM symbols are allocated as a data region to a PDSCH. The control channel may include a PCFICH (Physical Control Format Indicator Channel), PDCCH (Physical Downlink Control Channel), PHICH (Physical Hybrid ARQ Indicator Channel), and the like.

Figure 4:
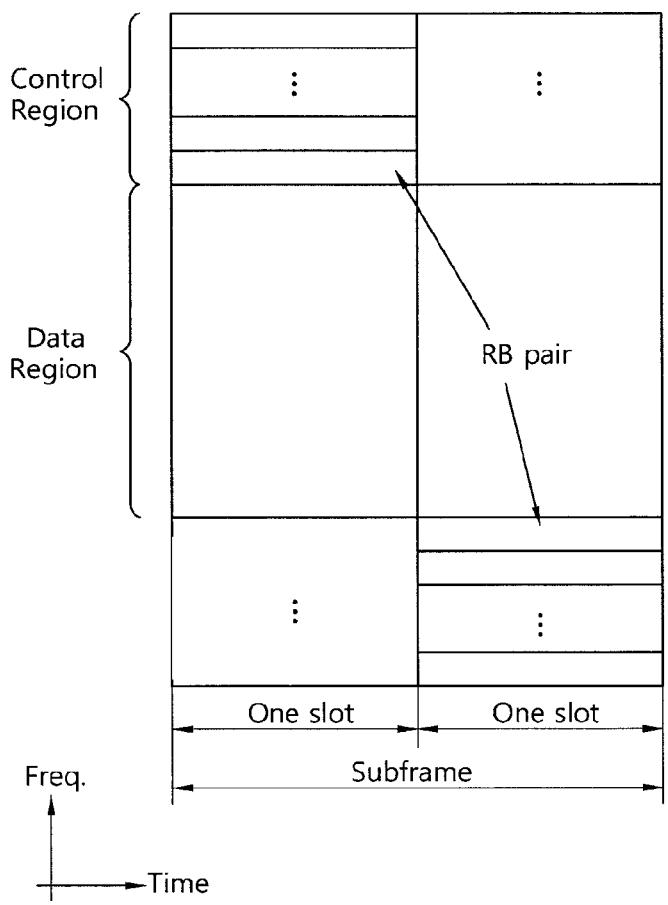
FIG. 4 is a view illustrating the structure of an uplink subframe according to an exemplary embodiment of the present invention.

FIG. 4 is a view illustrating the structure of an uplink subframe according to an exemplary embodiment of the present invention.

With reference to FIG. 4, the uplink subframe includes a control region and a data region in the frequency domain. A PUCCH (Physical Uplink Control Channel) for delivering uplink control information is allocated to the control region. A PUSCH (Physical Uplink Shared Channel) for delivering user data is allocated to the data region.

The PUCCH of a single terminal is allocated as a pair of resource blocks in a single subframe, and the resource blocks included in the pair of resource blocks are positioned as different subcarriers in two slots.

Figure 5:
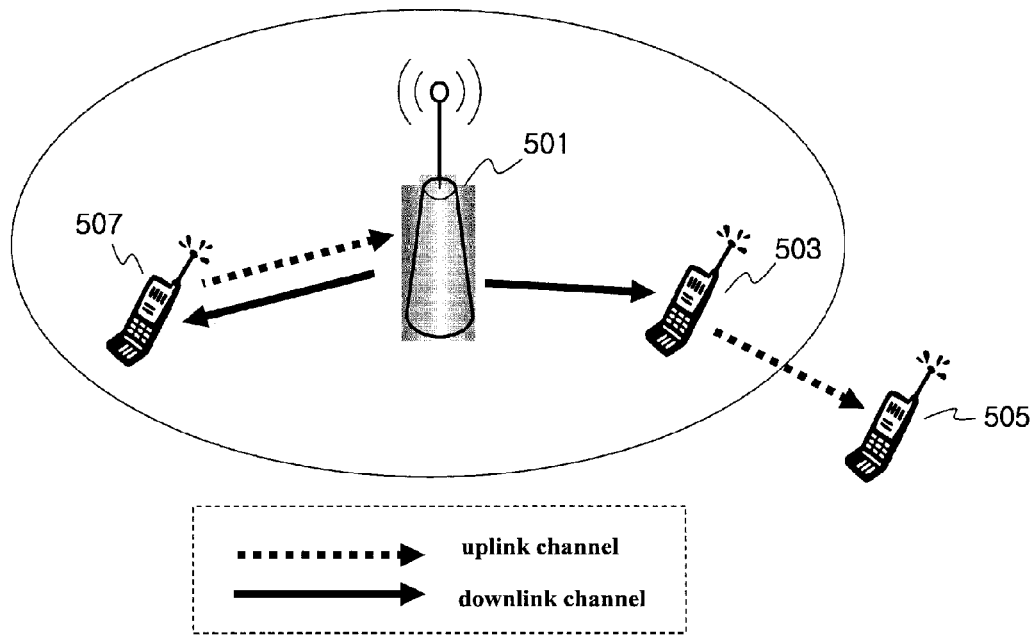
FIG. 5 is a view schematically showing a relay system according to an exemplary embodiment of the present invention.

FIG. 5 is a view schematically showing a relay system according to an exemplary embodiment of the present invention.

In case of the existing wireless communication system, a terminal receives a signal from a base station through a downlink resource, and transmits a signal to the base station through a uplink resource. The present invention proposes a method for allowing the terminal to receive a signal through the uplink resource in order to perform various operations.

In addition, in an FDD (Frequency Division Duplex) system, the uplink resource may be a subframe of an uplink frequency band, and in a TDD (Time Division Duplex) system, the uplink resource may be a subframe corresponding to an uplink time interval.

With reference to FIG. 5, a first terminal 503 and a third terminal 507 exist within the coverage of a base station 501, and a second terminal 505 exists outside the coverage of the base station 501.

In this case, in order to transmit data to the second terminal 505, the base station 501 operates the first terminal 503 as a relay terminal. Namely, the first terminal 503 is allowed to transmit a signal to the second terminal 505, not the base station 501, through the uplink resource (uplink channel) and the second terminal 505 is allowed to receive the signal through the corresponding uplink resource, thus operating the first terminal 503 like a relay node. Hereinafter, the terminal operating as a relay, like the first terminal 503, will be referred to as a relay terminal.

In an example of utilizing the above embodiment, the coverage of an emergency service, such as a disaster broadcast, an emergency call, and the like, can be extended by using the relay terminal 503.

In case of the second terminal 505, when a signal is not detected through a downlink resource for more than a certain time, when it has been previously set such that the uplink resource is received through a downlink control signal, or when it has been set such that the user receives a signal through the uplink resource, the second terminal 505 may be operated to detect a relay signal of the relay terminal 503 in the uplink resource.

In this case, while the relay terminal 503 is delivering transmission data of the base station 501 to the second terminal 505 through the uplink resource, the base station 501 may perform scheduling on the uplink resource so that no interference may occur with the uplink resource of the nearby terminal 507.

Namely, the uplink resource though which the signal of the relay terminal 503 is to be transmitted may be emptied, the uplink resource may not be allocated to the nearby terminal, or the corresponding uplink resource may be allocated to a terminal that does not interrupt the signal of the relay terminal 503, e.g., the third terminal 507 which is physically distant from the first terminal 503 as the relay terminal as shown in FIG. 5.

Figure 6:
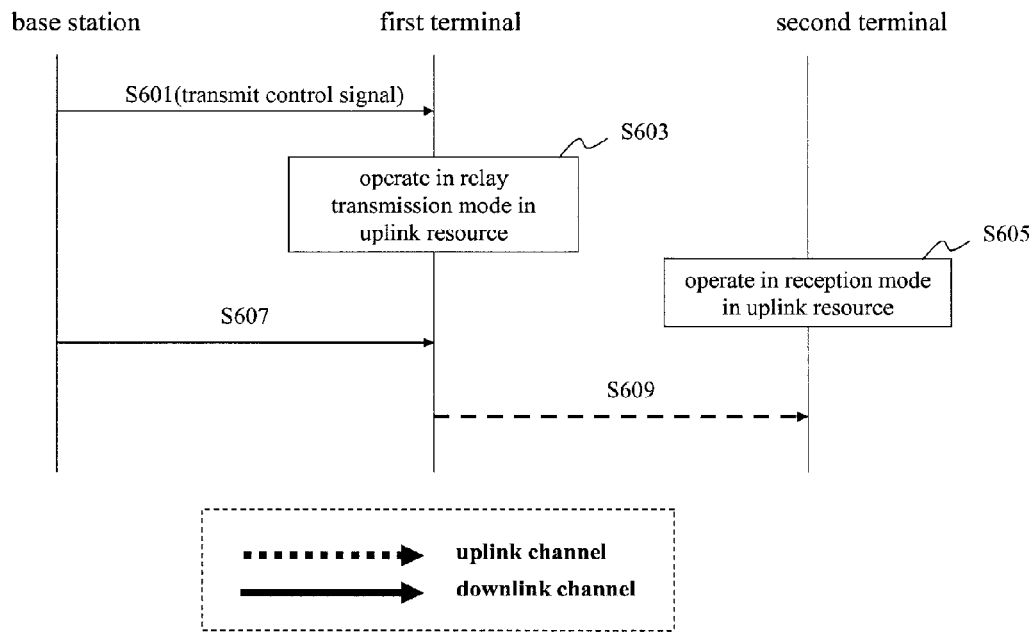
FIG. 6 is a flow chart illustrating the sequential process of a method for relaying operation through an uplink resource according to an exemplary embodiment of the present invention.

FIG. 6 is a flow chart illustrating the sequential process of a method for relaying operation through an uplink resource according to an exemplary embodiment of the present invention.

The base station transmits a control signal to the relay terminal (i.e., the first terminal) (S601). The control signal may be transmitted from the base station periodically or non-periodically, and controls the first terminal to be changed into a relay transmission mode in the uplink resource (channel).

Upon receiving the control signal from the base station, the first terminal may be operated in the relay transmission mode in which it can retransmit the signal transmitted from the base station to nearby terminals through the uplink resource based on control information set in the control signal (S603). However, even without the control signal from the base station, the first terminal is able to broadcast the signal, which has been received from the base station, so that the nearby terminals can received the signal through the uplink resource.

In addition, when a signal is not detected through a downlink resource for more than a certain time, when it has been previously set such that the uplink resource is received through a downlink control signal, or when it has been set such that the user receives a signal through the uplink resource, the second terminal 505 is changed to the reception mode in which it can receive a relay signal of the relay terminal (i.e., the first terminal) in the uplink resource (S605).

Meanwhile, the relay terminal receives multicast or broadcast data from the base station through the downlink channel (S607) and broadcasts data to the second terminal through the uplink resource.

In this case, the multicast or broadcast service transferred by the base station may be an emergency service such as a disaster broadcast, and the like.

Figure 7:
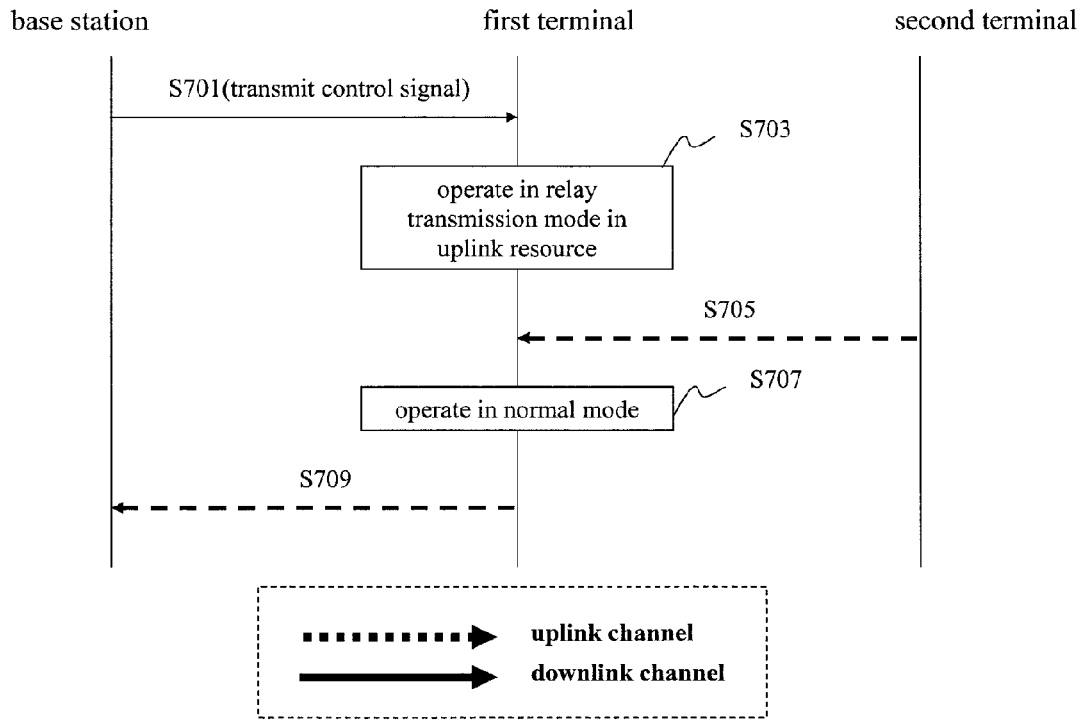
FIG. 7 is a flow chart illustrating the sequential process of a method for relaying operation through an uplink resource according to another exemplary embodiment of the present invention.

FIG. 7 is a flow chart illustrating the sequential process of a method for relaying operation through an uplink resource according to another exemplary embodiment of the present invention.

In the embodiment of FIG. 7, the first terminal within the coverage of the base station receives a signal transmitted by the second terminal existing outside the coverage of the base station through the uplink resource, and the first terminal transmit the signal received from the second terminal or information of the second terminal for an emergency service, and the like to the base station.

First, the base station transmits a control signal for receiving a signal in the uplink resource to the terminals (e.g., the first terminal) within the coverage of the base station periodically or non-periodically (S701).

Upon receiving the control signal, the first terminal is changed to operate in a reception mode in the uplink resource according to a certain time and period set in control signal in order to detect signals from terminals existing outside the coverage of the base station (S703).

The second terminal outside the coverage of the base station broadcasts its information or a transmission signal through the uplink resource (S705). In this case, because the terminals (e.g., the first terminal), which have received the control signal from the base station, are operated in the reception mode in the uplink resource, they can detect broadcast signals from the terminals existing outside the coverage.

Upon detecting the signal broadcast by the second terminal, the first terminal performs mode changing to operate in a normal mode (S707) and then delivers the broadcast signal from the second terminal to the base station through the uplink resource in the normal mode (S709).

Figure 8:
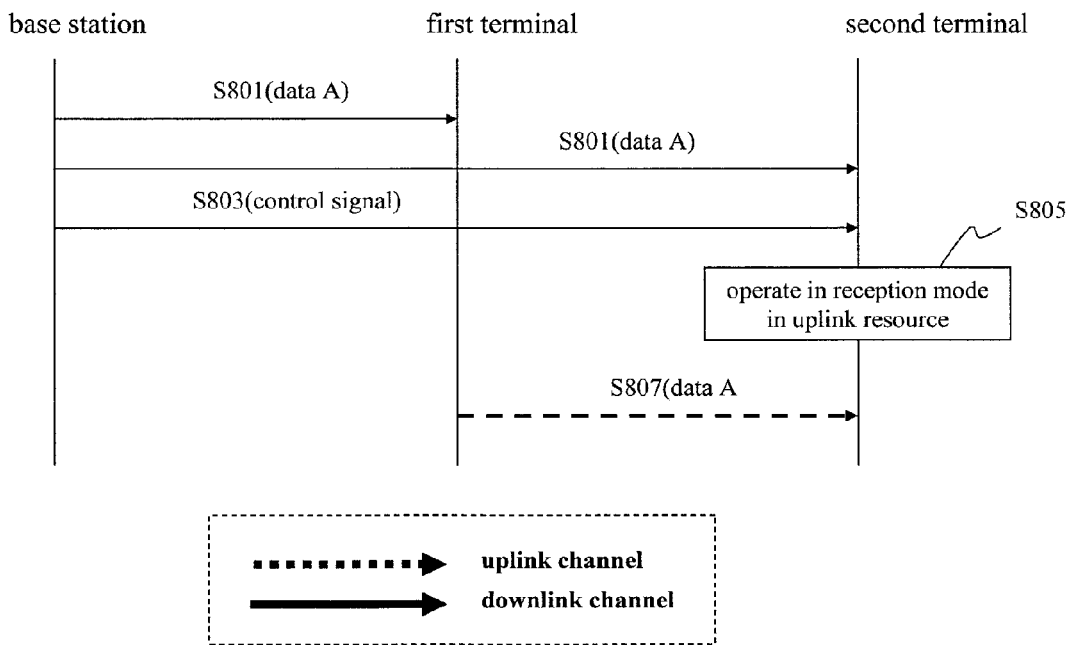
FIG. 8 is a flow chart illustrating the sequential process of a method for relaying operation through an uplink resource according to another exemplary embodiment of the present invention.

FIG. 8 is a flow chart illustrating the sequential process of a method for relaying operation through an uplink resource according to another exemplary embodiment of the present invention.

The base station transmits data A to the terminals in a multicast or broadcast manner (S801).

In this case, when the first terminal has successfully received the data A transmitted from the base station but the adjacent second terminal fails to receive it, the base station transmits a control signal to make the second terminal operate in the reception mode in the uplink resource (S803).

Upon receiving the control signal, the second terminal performs mode changing to operate in the reception mode in the uplink resource (S805).

Thereafter, the first terminal re-transmits the data A in place of the base station (S807).

Accordingly, the second terminal can combine the signal retransmitted by the first terminal and the signal received from the base station to obtain cooperative diversity.

According to an exemplary embodiment of the present invention, two terminals can perform direct communication with each other by using the uplink resource. Namely, the first terminal may transmit data to the second terminal through the uplink resource and, at the same time, the second terminal receives the signal in the uplink resource, whereby the two terminals can directly transmit and receive data.

Figure 9:
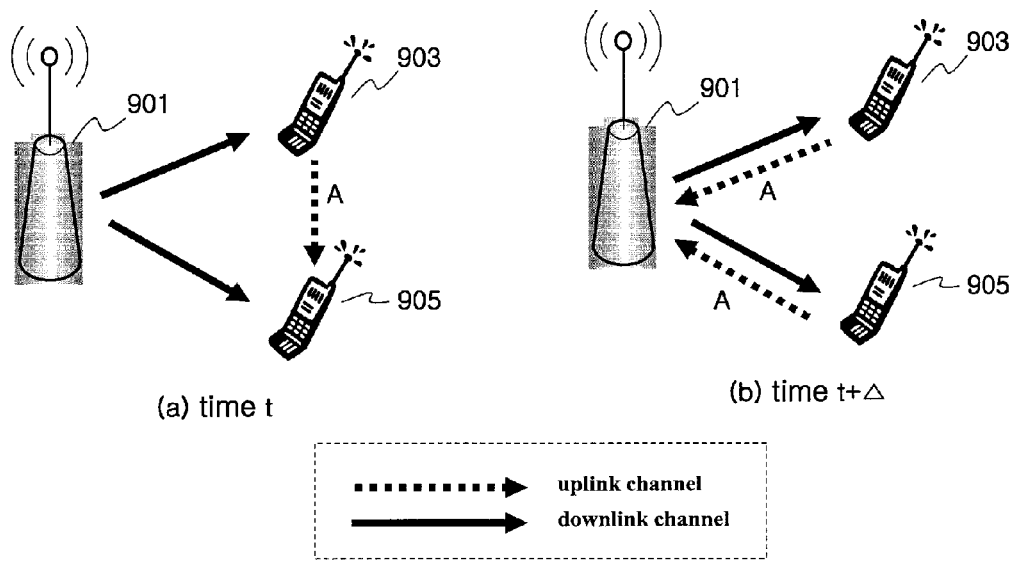
FIG. 9 is a view illustrating an uplink transmission in a cooperative diversity format through an uplink resource according to another exemplary embodiment of the present invention.

In this case, as shown in FIG. 9, an uplink transmission in the form of cooperative diversity can be performed between the two terminals by utilizing the data transmission and reception method between two terminals.

Namely, as shown in FIG. 9(a), when a second terminal 905 receives data A which has been directly transmitted by a first terminal 903, or when the second terminal 905 overhears the data A which is transmitted by the first terminal 903 to a base station 901 (not shown), the first terminal 903 and the second terminal 905 may transmit the corresponding data to the base station 901 in a next stage, for cooperative communication.

Figure 10:
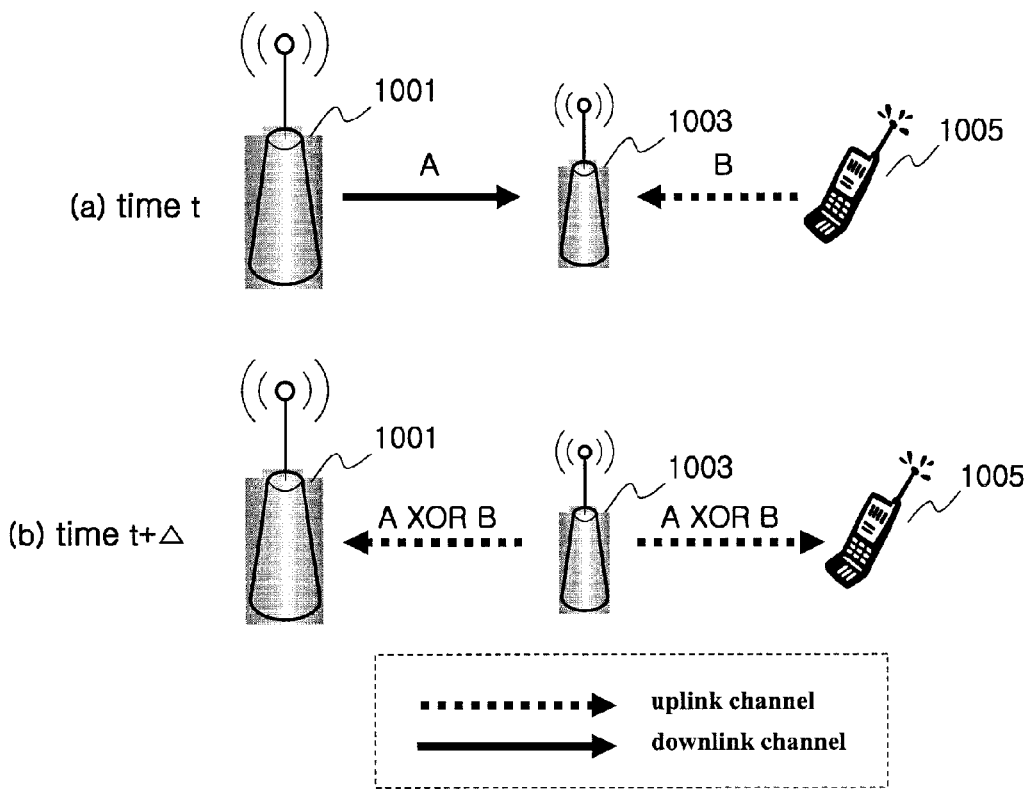
FIG. 10 is a view illustrating a method for relaying operation through an uplink resource according to another exemplary embodiment of the present invention.

FIG. 10 is a view illustrating a method for relaying operation through an uplink resource according to another exemplary embodiment of the present invention.

As shown in FIG. 10, in a system using network coding, the uplink resource can be used when a relay 1003 combines signals A and B, which have been received from a base station 1001 and a terminal 1005, at a time (t) (FIG. 10(a)) to generate a network coded signal (e.g., XORed value of the two signals), and transmits the network coded signal to the base station 1001 and the terminal 1005 at a time (t+Δ).

If the relay 1003 transmits the network coded signal to the base station 1001 and the terminal 1005 through the downlink resource, because the corresponding base station 1001 operates in the reception mode in the downlink resource, it is strongly interfered by downlink signals of other base stations, resulting in a waste of the downlink resource. However, as shown, when the uplink resource is used, because the terminal 1005 receives the signal of the corresponding uplink resource, such a problem can be solved.

Figure 11:
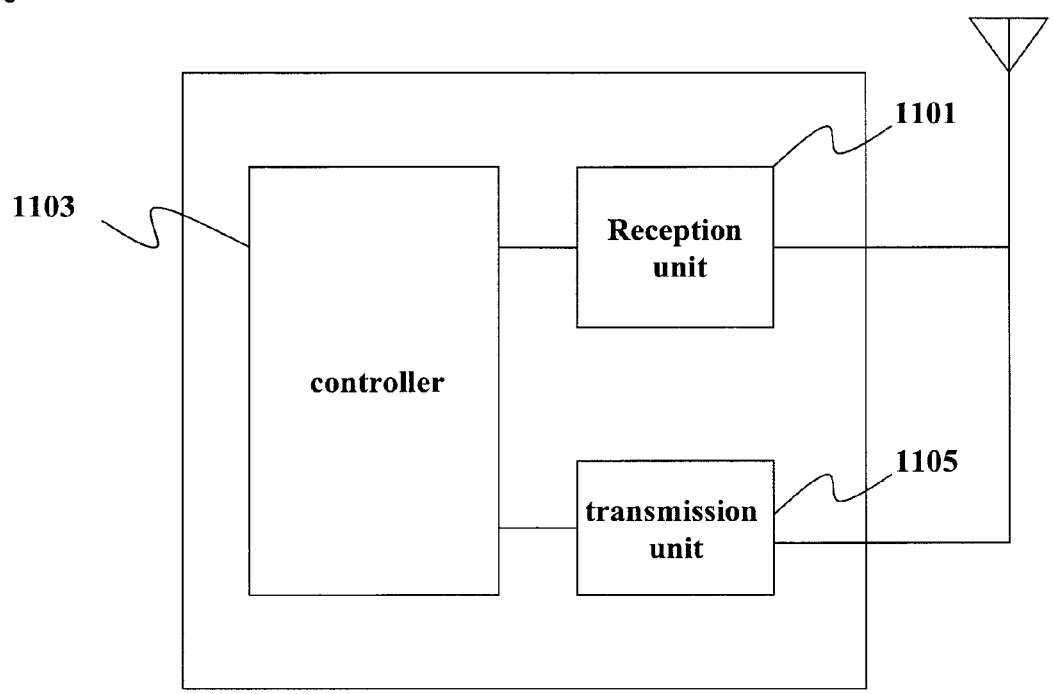
FIG. 11 is a schematic block diagram showing the configuration of a relay terminal according to an exemplary embodiment of the present invention.

FIG. 11 is a schematic block diagram showing the configuration of a relay terminal according to an exemplary embodiment of the present invention.

The relay terminal includes a reception unit 1101 configured to receive data from a base station and an adjacent terminal, a controller 1103, and a transmission unit 1105.

The controller 1103 controls the terminal to receive a control signal, configured to receive data through an uplink resource, from the base station through the reception unit 1101, change into an uplink resource reception mode to receive data through the uplink resource based on the received control signal, receive data from an adjacent terminal through the uplink resource, and transmit the data to the base station through the uplink resource.

The transmission unit 1105 transmits terminal information or data such as an emergency call signal, or the like, received from an adjacent terminal to the base station through the uplink resource according to a controlling operation of the controller 1103, or transmits multicast or broadcast data from the base station to the adjacent terminal.

In addition, according to the controlling of the mode changing operation by the controller 1103, the terminal may be changed into the uplink resource reception mode at a certain time or period set in the control signal.

As described above, besides the above-described elements, the apparatus according to an exemplary embodiment of the present invention may basically include software or hardware, e.g., an output device (e.g., a display, a speaker, etc.), an input device (e.g., a keypad, a microphone, etc.), a memory, a transceiver (e.g., an RF module, an antenna, etc.), required for implementing the technical idea of the present invention. Those elements are obvious to the skilled person in the art, so its detailed description will be omitted.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for receiving downlink data from a base station through a relay terminal present in a service area of the base station, the method performed by a mobile station which is adjacent to the relay terminal and comprising:
    changing into an uplink resource reception mode to receive the downlink data from an uplink resource;
    receiving the downlink data through the uplink resource, wherein the downlink data is transmitted from the base station and is delivered by the relay terminal; and
    decoding the received downlink data.

2. The method of claim 1, wherein, in changing into the uplink resource reception mode, when a reception signal from downlink resource is not detected for more than a certain time, a current mode is changed to the uplink resource reception mode.

3. The method of claim 1, wherein, in changing into the uplink resource reception mode, changing into the uplink resource reception mode is previously set by a downlink control signal previously received from the base station.

4. The method of claim 1, wherein, in changing into the uplink resource reception mode, a current mode is changed into the uplink resource reception mode according to a user setting.

5. The method of claim 1, wherein the uplink resource is a subframe of an uplink frequency band or a subframe of an uplink time interval.

6. The method of claim 1, wherein the base station does not allocate the uplink resource to a nearby terminal which is deployed within a certain distance from the relay terminal so that no interference from an uplink resource of the nearby terminal may occur to the relay terminal while the relay terminal is delivering the downlink data of the base station through the uplink resource.

7. The method of claim 1, wherein the downlink data is service data or an emergency call.

8. A method of operating a relay terminal relaying a communication service between an adjacent terminal and a base station by using an uplink resource, the method comprising:
    receiving a control signal from the base station, wherein the control signal indicates change of the relay terminal into a relay transmission mode using the uplink resource;
    changing into the relay transmission mode so that downlink data from the base station can be delivered to the adjacent terminal through the uplink resource;
    receiving the downlink data from the base station by using a downlink resource; and
    transmitting the received downlink data to the adjacent terminal by using the uplink resource.

9. The method of claim 8, wherein the control signal is periodically or non-periodically received.

10. The method of claim 8, wherein the uplink resource is a subframe of an uplink frequency band or a subframe of an uplink time interval.

11. The method of claim 8, wherein the downlink data is service data or an emergency call.

* * * * *